INVENTORS
Leonard J. Sahs &
BY Harry W. Mould, Jr.,
ATTORNEY.

United States Patent Office 2,733,600
Patented Feb. 7, 1956

2,733,600

APPARATUS FOR TESTING REFRIGERATION COMPRESSORS

Leonard J. Sahs, Hamburg, and Harry W. Mould, Jr., Kenmore, N. Y., assignors to Fedders-Quigan Corporation, Buffalo, N. Y.

Application October 4, 1952, Serial No. 313,118

5 Claims. (Cl. 73—168)

This invention relates to an apparatus for testing refrigeration compressors and other gas pumps, and it has particular reference to the provision of means whereby the capacity and other performance characteristics of the pump may be readily determined.

Standard test methods for evaluating the capacity of a refrigeration compressor under a given set of conditions require extensive and careful observations and calculations to be made by a team of qualified engineers. The time required for such a test is also long, and several days may elapse before the test data from a complete analysis can be reduced to ultimate conclusions. The test code of the American Society of Refrigerating Engineers, for example, is designed to give detailed information when properly followed, but it is too complex for use as a control method for checking the quality of compresors manufactured or used in production quantities.

The present invention contemplates an apparatus particularly adapted to test refrigeration compressors for their capacity, and to obtain practical and satisfactory information in a matter of minutes, as compared to the relatively long period of time required by a full code test. To this end, there is established a standard compressor-condenser-expander refrigeration circuit, which is utilized to cool a heat transfer medium, such as water or brine, to a suitable low temperature. There is also established a test circuit, which is to include the compressor undergoing test, suitable valves and fittings, and a heat interchanger and a flow meter connected in series between the discharge and suction ports of the test compressor. A third circuit is provided for the water or brine cooled by the evaporator of the first circuit, and this liquid circuit is in heat exchange relationship with the expander of the first circuit, and the heat interchanger of the second or test circuit.

The test is conducted by coupling the test compressor into its circuit, and circulating a test refrigerant therethrough under predetermined conditions of discharge and suction pressure and temperature, the latter values being controlled by extraction of heat from the compressed refrigerant in the test circuit by the water in the liquid circuit. The quality of the refrigerant flowing into the suction port of the compressor is thus made constant and determinable, and such refrigerant, just prior to entering the compressor, passes through the flow meter, which can be of a type or calibrated to read in terms of weight of refrigerant accepted by the compressor in a unit of time.

This value is indicative of the capacity of the compressor, and, by means of suitable graphs or tables, it can be readily transformed into other criteria of performance, such as available refrigerating effect expressed as Btu/hour, tons of refrigeration, or the like. The ascertainment of this value is sufficient for the manufacturer of the compressor, or the quantity purchaser who will incorporate the compressor into a complete refrigeration plant, to determine whether or not the compressor production lines are functioning properly to produce articles meeting the standards of the vendor and purchaser. Hence, the test may be utilized as a quality control test, as it may be completed in a short period of time, and it requires no complex thermodynamic calculations to arrive at the significant numerical conclusions.

Those desiring to practice the invention will recognize that they have a wide range of choice in the selection of the particular instrumentalities which make up the several circuits, and that suitable components may be obtained on the open market from numerous manufacturers. In view of this circumstance, and to facilitate explanation, the invention is illustrated more or less diagrammatically in the accompanying drawing, wherein.

Figure 1:
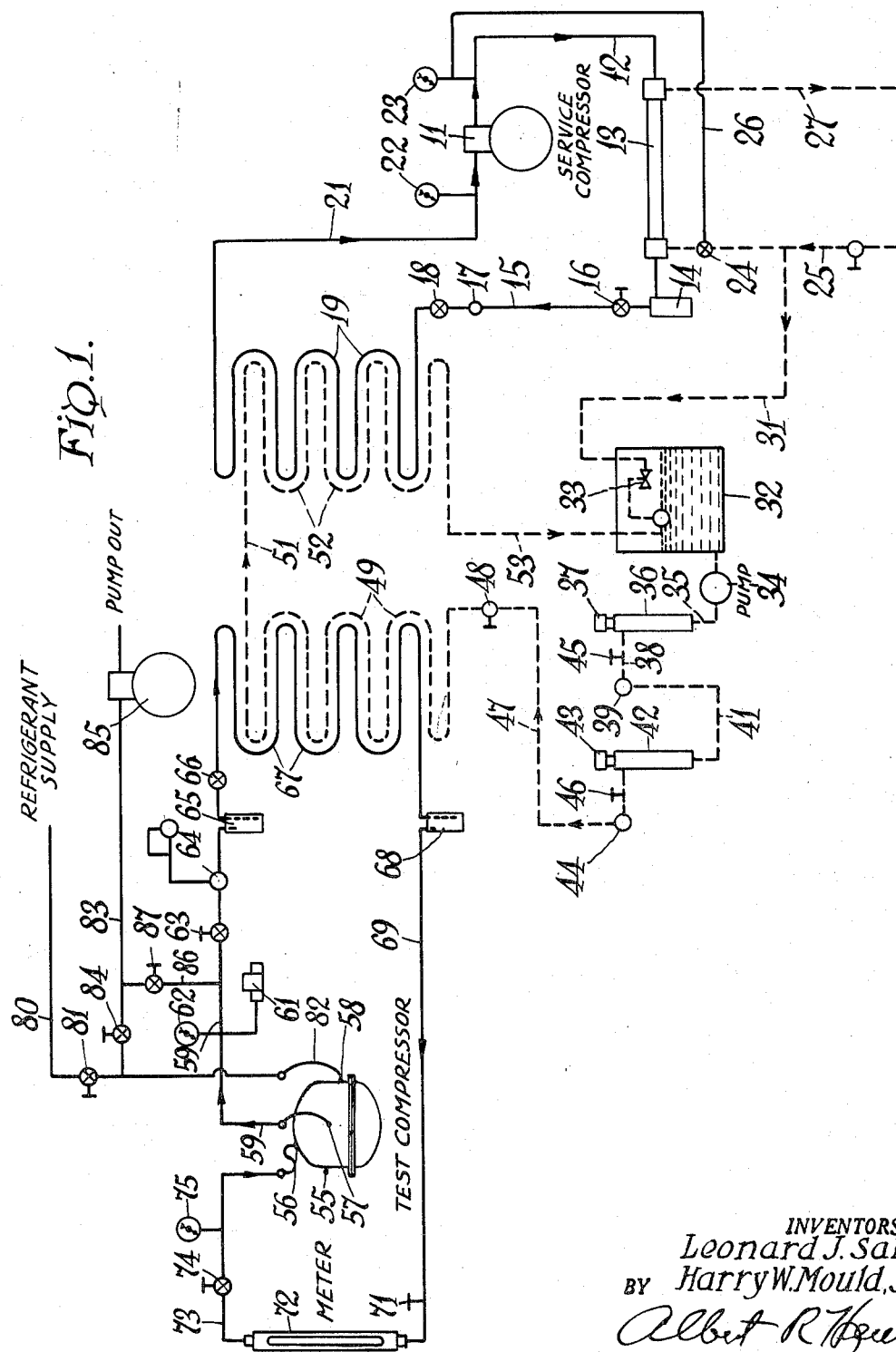
Fig. 1 is a line diagram of the three fluid circuits.

As shown in Fig. 1, the first mentioned or standard refrigerating circuit comprises a compressor 11 which discharges compressed volatile refrigerant into a line 12 leading to a condenser 13, which is advantageously of the water cooled type. The refrigerant leaving the condenser flows to a receiver 14, and thence through line 15 past a manual shut-off valve 16, sight glass 17, and automatic expansion valve 18 into an evaporator coil 19. The suction line 21 from the evaporator leads back to the compressor 11 in the usual manner. Suction and discharge pressure gauges 22 and 23 may be provided to indicate the performance in the refrigerating circuit, and a water regulating valve 24 may be included in the condenser water supply line 25, being made responsive to discharge pressure through a line 26. Condenser waste water is discharged to a drain through line 27.

As previously noted, the basic function of the refrigerating circuit is to cool water or brine in the liquid circuit, which is shown in Fig. 1 in dotted lines. It comprises a supply line 31 connected to the water line 25 which discharges into a storage tank 32 through a conventional float-operated valve 33. The tank is connected to the inlet port of a circulating pump 34, which discharges through line 35 into a closed tube 36 in which is positioned a heating element 37, such as an enclosed electric resistance coil. The liquid then flows through a line 38 to a temperature responsive control switch 39 which governs the supply of current to the heater 37. A line 41 leads from the switch 39 to a second column 42, which also contains a heating element 43 whose operation is controlled by a second thermal switch 44. Thermometer or thermocouple wells 45 and 46 are provided in the piping on the discharge side of the tubes 36 and 42 so that the liquid temperature may be observed, and such adjustment made of the switches as may be indicated.

A line 47 leads from the switch 44 through a manual shut-off valve 48 into a heat exchange coil 49, which, as will presently appear, is associated with the test compressor circuit. The discharge end of the coil 49 is connected through a line 51 with a second heat exchange coil 52, which is in heat exchange relation with the evaporator coil 19 of the refrigerating circuit. Liquid flowing from the coil 52 returns to the tank 32 through a line 53, thus completing the liquid circuit. The coils 19 and 52 need not be elaborate; they may consist of a tube in tube arrangement, or a pair of spirally wound coils or serpentine coils which are mechanically bonded to each other to assure good heat transfer.

The test circuit may be described and traced beginning with a test compressor 55, which is indicated as being of the hermetic type, having suction and discharge valve port fittings 56 and 57, and a service or charging port 58. By means of a suitable length of flexible tubing, the discharge port 57 is connected to a discharge line 59, in which is inserted a high pressure or overload cut-out switch 61 and a pressure indicating gauge 62. The gauge registers the discharge pressure when the compressor is operatively connected in the circuit, while the switch 61 opens to disconnect the compressor motor if the head pressure exceeds a predetermined value, as is well understood. The line 59 then leads to a manually operable shut-off valve 63 and to a head pressure regulating valve 64. It may be mentioned that, in the actual reduction to practice of the invention, the valve 64 was of the type which may be set to open at some desired discharge pressure, and that pressure was obtained by applying compressed air to the valve diaphragm, so that close regulation could be obtained and readily determined by a valve in the air supply line.

The line 59 then leads into an oil separator and trap 65, and then to an adjustable automatic expansion valve 66, which admits refrigerant to a heat exchange coil 67, which is in heat exchange relation with the water coil 49, in the same fashion as previously described with respect to coils 19 and 52. The suction end of the coil 67 leads to a second oil trap 68, which is connected to a return line 69, equipped with a thermometer well 71, leading to a flow meter 72. Discharge from the meter is connected to the suction port fitting 56 of the compressor 55 through a line 73 which is equipped with a shut-off valve 74 and a suction pressure gauge 75.

The closed circuit just described is that employed during the actual running of the test, and it will be seen that while it has some similarity to a conventional refrigeration circuit, it differs therefrom in that, as it may be said, the condenser and evaporator are combined in the coil 67. That is, admission of hot compressed refrigerant to the coil 67 is through a typical expansion valve usually associated with an evaporator, and which operates in the present instance to govern suction pressure. At the same time, the hot, reduced pressure refrigerant is cooled in the coil 67 by heat exchange with the liquid coil 49, and from this aspect, the coil 67 has some similarity to a water cooled condenser, although the refrigerant is not reduced to a liquid state.

Branch circuits are connected to the closed test circuit for the purpose of charging and evacuating the closed circuit. A supply line 80, which may be connected to a tank of compressed refrigerant, leads through a shut-off valve 81 to a flexible terminal 82 which may be connected to the service port 58 of the compressor 55, thereby to admit refrigerant gas to the system. A branch line 83, connected to the line 80 on the compressor side of the valve 81, leads through a shut-off valve 84 to an exhaust pump 85, thereby providing a means for evacuating the compressor through the service connection 58. A second exhaust line is provided by a line 86, containing a shut-off valve 87, between the line 83 and the discharge line 59, interposed between the discharge side of valve 84 and the inlet side of valve 63. This connection directly connects the compressor discharge to the exhaust pump.

Figure 2:
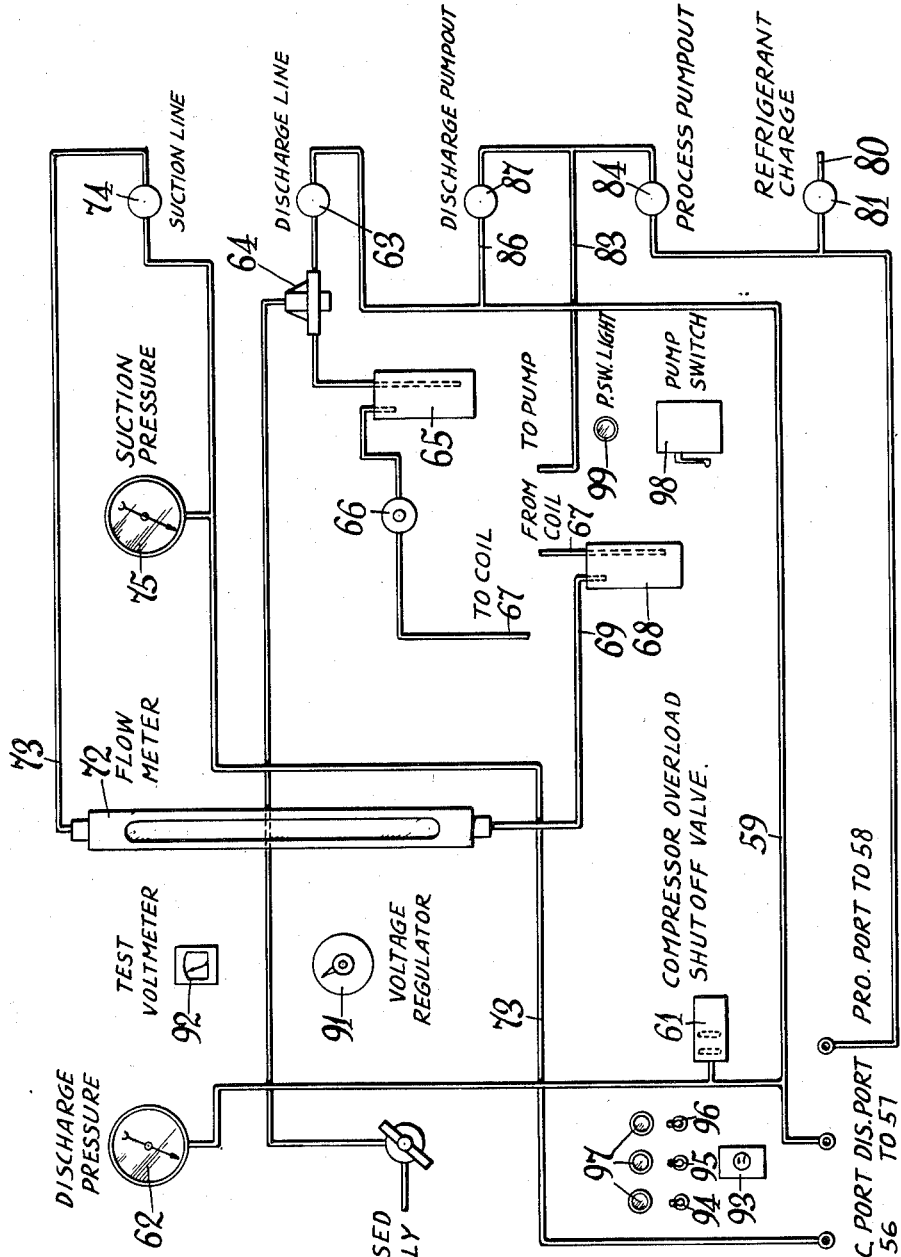
Fig. 2 is an elevation showing some of the components as they may be mounted on a control panel, the other elements being positioned behind the panel or remote therefrom, as may be desired.

Fig. 2 illustrates a front elevation of a panel board arrangement, upon which the control instrumentalities may be mounted for facility of operation and observation. Parts heretofore described have been designated by the same reference numerals. As previously noted, other components may be positioned behind the panel, or remote therefrom, as is found most expedient. The test circuit tubes and pipes are advantageously insulated to protect them from the effects of variations in air temperature, and we have found it conducive to more accurate measurements to place the test compressor in a box for the same purpose. Our preference is to employ thermocouples for temperature measurements, and this we do by clipping on the instrument leads at appropriate points on the tubing, and positioning the registering meter adjacent the panel.

It will be noted that the flow meter 72 is of the "rotameter" type, in which the density and velocity of the fluid flowing therethrough elevates a float a distance within the meter tube proportional to the effect of these factors. The meter reading is therefore an index of the amount of refrigerant entering the compressor in a unit of time. The meter scale may be calibrated against a compressor of known capacity which has been evaluated with the same kind of refrigerant to be employed in conducting the tests. In addition to the previously described elements, the panel also includes a voltage regulator 91 and voltmeter 92, which are connected into the test compressor motor circuit, which circuit is conventional and needs no detailed description or illustration. By impressing a constant voltage, as, for example, 115 volts, on the compressor motor, it may safely be assumed that the motor speed, and therefore the cubic displacement of the compressor in a unit of time, will remain constant.

The temporary connections to the compressor motor may be plugged into a switch box 93, and the control of current to the test compressor motor, and the motors for the compressor 11 and exhaust pump 85, is effected through switches 94, 95, and 96. Signal lights 97 in the several circuits indicate whether the circuits are open or closed. The control for the motor of the water pump 34 is effected through a switch 98 in its circuit, which also includes a signal light 99.

The invention may be further described by reference to a preferred procedure in testing a compressor. A fractional horsepower hermetic compressor, for example, is selected and is placed in its box, and connections to the discharge, suction, and service ports are made through the lines 57, 56, and 58. Manual valves 74, 84 and 87 are then opened, with valves 81 and 63 closed, and the exhaust pump 85 is started and operated until the suction gauge 75 shows a reduction of pressure within the compressor to about twenty-eight inches of vacuum. The valves are then closed, and valve 81 is opened to admit the refrigerant, for example Freon F–12, from its storage tank to the compressor crank case. The gas is under pressure, and will continue to flow until the pressures are equalized at some variable value, say around seventy pounds gauge. The mass of gas so admitted to the compressor is sufficient for the purposes of the test. Valve 81 is then closed.

Valves 63 and 74 are again opened, and compressed air is impressed on the pressure regulating valve 64, so that the test compressor must develop a predetermined discharge pressure in order to force refrigerant through the test circuit. It will be understood that the compressor 11 of the standard refrigerant circuit, and the pump 34 of the water circuit, have already been placed in operation. The test compressor is then started and the air pressure on the valve 64 is adjusted to bring the compressor discharge pressure to a suitable value, say 180 pounds gauge. As the hot compressed refrigerant flows through the test circuit, it will be cooled by water flowing through the heat interchanger 49, while its pressure will be reduced in passing through the expansion valve 66. This valve is adjusted to produce a suitable suction pressure in the line 69 of say forty-five pounds gauge, and the circulation of refrigerant is continued until it reaches a temperature of say sixty-five degrees Fahrenheit, corresponding, for the stated suction pressure, to a condition of superheat such as may be encountered in service.

The numerical values just stated are merely typical, and they may be varied as desired. The flow meter 72 is, as previously noted, calibrated against the refrigerant for a sufficient number of various pressure and temperature conditions, so that its reading, for any specific combination of temperature and pressure, may be converted to a value of mass of refrigerant per unit of time, which gives the capacity of the compressor for that particular condition. Readings are taken when the conditions have become constant. For quality control testing, a single set of conditions will usually suffice, while for a more exhaustive analysis, readings will be taken under a series of pressure and temperature conditions, and with variations in the compressor motor voltage. In either event, the desired information is obtained quickly and without the necessity of extended calculations.

The cooling water or brine flowing in the liquid circuit is subcooled below a temperature required to produce the desired suction temperature in the refrigerant test circuit, and then is reheated as may be necessary by the thermostatically controlled resistance heaters 37 and 43. This has been found to give quicker regulation of the suction temperature in the test circuit, than intermittent operation of the pump 34 or compressor 11. Thermostatic switch 39, controlling heater 37, is advantageously adjusted to bring the circulating liquid to within say two degrees of the temperature required to obtain the desired suction temperature, and the final adjustment is made by the heater 43. A further control may be effected, when indicated, by throttling the manual control valve 48.

During the capacity test, other observations may be made, such as the extent of noise and vibration in the compressor, and whether there is excessive overheating. Sight glasses in the traps 65 and 68 will permit observation respecting the amount of oil pumped by the compressor, and which oil should be removed as far as possible to render the refrigerant a true gas as it enters the flow meter. When the test is completed, the various valve and switches are manipulated to exhaust the test refrigerant through the vacuum pump 85.

It will accordingly be seen that the invention provides a means for spot testing compressors to ascertain their capacity and other attributes, and that the test may be conducted expeditiously with results sufficiently accurate and complete for all practical production and engineering purposes. While the invention has been described with respect to a single embodiment, it is obvious that it is susceptible of numerous modifications and variations without departure from its principles, or the features within the scope of the following claims.

We claim:

1. Apparatus for testing the capacity of a gas compressor comprising a test circuit adapted to include a compressor to be tested, a discharge line for said compressor, a pressure regulating valve in said discharge line whereby the discharge pressure may be governed, a pressure reducing valve in said line and a heat interchanger connected to the reducing valve to receive the compressor discharge, a suction line from said heat interchanger adapted to be connected to the suction port of said compressor, a flow meter in the suction line, instruments in said discharge and suction lines for ascertaining discharge and suction pressures and suction temperature, a separate circuit including a part in heat exchange relation with said heat interchanger of the test circuit, and means for circulating a cooling medium through said separate circuit.

2. Apparatus for testing the capacity of a gas compressor comprising a test circuit adapted to include a compressor to be tested, a discharge line for said compressor, a discharge pressure control valve in said line, a heat interchanger connected to said control valve, a suction line from said heat interchanger for return of gas to said compressor, a flow meter in the suction line, valve means in said circuit to reduce the pressure of gas returning to said compressor, a separate circuit including a heat transfer element in heat exchange relation with the heat interchanger of said test circuit, means for circulating a cooling medium through said separate circuit, and a third circuit including a refrigerating medium for extracting heat from the cooling medium circulated in said separate circuit.

3. Apparatus for testing the capacity of a gas compressor comprising a refrigeration circuit including a service compressor, condenser, and evaporator connected in a closed cycle, a liquid circuit comprising a storage tank, pump, and two heat interchangers connected in series between the discharge and suction ports of the pump, one of said heat interchangers being in heat exchange relation with the evaporator of the refrigeration circuit, a test circuit including a compressor to be tested, a third heat interchanger in said test circuit in heat exchange relation with the other of the heat interchangers in the liquid circuit, a flow meter, a discharge line from the test compressor to said third heat interchanger and a suction line from said third heat interchanger to the flow meter and thence to the suction port of said test compressor, a discharge pressure regulating valve in the discharge line between the test compressor and third heat interchanger, an expansion valve connected to the third heat interchanger to reduce the pressure of gas flowing to the meter, and measuring instruments in said test circuit to determine conditions of pressure and temperature therein.

4. Apparatus as set forth in claim 3, wherein the test circuit includes branch lines connected to the ports of the test compressor, shut off valves in said lines, and means connected to said lines for selectively exhausting and admitting gas to the test compressor.

5. Apparatus as set forth in claim 3, wherein the heat interchanger of the liquid circuit which is in heat exchange relation with the evaporator of the refrigerant circuit discharges into the storage tank, the pump circulates liquid from the storage tank to the other heat interchanger, and thermally responsive heating means interposed between the discharge side of said pump and said other heat interchanger.

References Cited in the file of this patent

UNITED STATES PATENTS

| | | |
|---|---|---|
| 2,172,095 | White | Sept. 5, 1939 |
| 2,566,742 | Odell | Sept. 4, 1951 |

OTHER REFERENCES

Refrigeration by Moyer and Fritz, 1st edition, 1928, pp. 275–277.

Refrigeration Principles & Practice, Ezer Griffiths, 1951, pp. 332–346.